(12) United States Patent
Pike (10) Patent No.: US 9,274,844 B2
(45) Date of Patent: Mar. 1, 2016

(54) PRIORITY-BASED MANAGEMENT OF SYSTEM LOAD LEVEL

(71) Applicant: Microsoft Technology Licensing, LLC, Redmond, WA (US)

(72) Inventor: Rob Pike, Woodinville, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 89 days.

(21) Appl. No.: 14/089,135

(22) Filed: Nov. 25, 2013

(65) Prior Publication Data

US 2014/0157281 A1 Jun. 5, 2014

Related U.S. Application Data

(63) Continuation of application No. 12/414,897, filed on Mar. 31, 2009, now Pat. No. 8,595,740.

(51) Int. Cl.
*G06F 9/455* (2006.01)
*G06F 9/46* (2006.01)
*G06F 9/50* (2006.01)

(52) U.S. Cl.
CPC .............. *G06F 9/505* (2013.01); *G06F 9/5083* (2013.01)

(58) Field of Classification Search
None
See application file for complete search history.

(56) References Cited

U.S. PATENT DOCUMENTS

| 6,944,678 | B2 | 9/2005 | Lu et al. |
| 7,158,972 | B2 | 1/2007 | Marsland |
| 7,296,133 | B2 * | 11/2007 | Swanberg ..................... 711/173 |
| 7,403,886 | B2 | 7/2008 | Odhner et al. |
| 7,693,995 | B2 * | 4/2010 | Kudo et al. ................... 709/226 |
| 8,024,736 | B1 * | 9/2011 | Graupner et al. ............. 718/104 |
| 2002/0087611 | A1 * | 7/2002 | Tanaka et al. ..................... 709/1 |
| 2005/0262504 | A1 | 11/2005 | Esfahany et al. |
| 2006/0107087 | A1 | 5/2006 | Sieroka et al. |
| 2006/0146807 | A1 * | 7/2006 | Codaccioni et al. .......... 370/356 |
| 2006/0190482 | A1 | 8/2006 | Kishan et al. |
| 2007/0079308 | A1 | 4/2007 | Chiaramonte et al. |

(Continued)

FOREIGN PATENT DOCUMENTS

| CN | 1669001 A | 5/2003 |
| CN | 1450765 A | 10/2003 |

(Continued)

OTHER PUBLICATIONS

"VMware ESX Server 2.0", Retrieved at <<http://www.vmware.com/support/esx2/doc/esx20admin_res-CPU-options.html>>, Retrieved Date: Jan. 24, 2009, 2 Pages.

(Continued)

*Primary Examiner* — Corey S Faherty
(74) *Attorney, Agent, or Firm* — Henry Gabryjelski; Kate Drakos; Micky Minhas (57) ABSTRACT

Systems, methods, and computer program products are described herein for managing computer system resources. A plurality of modules (e.g., virtual machines or other applications) may be allocated across multiple computer system resources (e.g., processors, servers, etc.). Each module is assigned a priority level. Furthermore, a designated utilization level is assigned to each resource of the computer system. Each resource supports one or more of the modules, and prioritizes operation of the supported modules according to the corresponding assigned priority levels. Furthermore, each resource maintains operation of the supported modules at the designated utilization level.

20 Claims, 7 Drawing Sheets

(56) References Cited

U.S. PATENT DOCUMENTS

| 2007/0256048 | A1* | 11/2007 | Relyea et al. ............ 717/100 |
| 2008/0127220 | A1 | 5/2008 | Morris |
| 2008/0184254 | A1 | 7/2008 | Bernard et al. |
| 2008/0222638 | A1 | 9/2008 | Beaty et al. |
| 2009/0300597 | A1 | 12/2009 | George et al. |

FOREIGN PATENT DOCUMENTS

| CN | 1591342 A | 3/2005 |
| CN | 1604040 A | 4/2005 |
| JP | H11-65859 A | 3/1999 |
| JP | 2006-113828 A | 4/2006 |
| JP | 2006-236351 A | 9/2006 |

OTHER PUBLICATIONS

"AppSense—Performance Manager for VMware, Workload Management for your VMware Environment", Retrieved at http://www.repton.co.uk/library/appsense_performance_manager_for_vmware.pdf, 2005, 2 Pages.

"VMware ESX Server 2—ESX Server Performance and Resource Management for CPU-Intensive Workloads", In VMware White Paper, Feb. 14, 2006, pp. 1-23.

Mackinnon, Chris A., "Supply & Demand—How Capacity Planning & Management Differ in Physical & Virtual Environments", In Processor, vol. 30, Issue 44, Oct. 31, 2008, 3 Pages.

"VMware Infrastructure", Retrieved at <<http://www.qbssoftware.com/product_info.aspx?Current=DETAILEDINFO&product=VMWARINFRA>>, Retrieved Date: Jan. 24, 2009, 5 Pages.

"International Search Report & Written Opinion for PCT Patent Application No. PCT/US2010/028938", Mailed Date: Oct. 26, 2010, Filed Date: Mar. 26, 2010, 8 Pages.

"Non-final Office Action Received for U.S. Appl. No. 12/414,897", Mailed Date: Apr. 17, 2012, Filed Date: Mar. 31, 2009, 9 Pages.

"Non-final Office Action Received for U.S. Appl. No. 12/414,897", Mailed Date: Jan. 14, 2013, Filed Date: Mar. 31, 2009, 10 Pages.

"Final Office Action Received for U.S. Appl. No. 12/414,897", Mailed Date: Jul. 25, 2012, Filed Date: Mar. 31, 2009, 10 Pages.

"Final Office Action Received for U.S. Appl. No. 12/414,897", Mailed Date: May 8, 2013, Filed Date: Mar. 31, 2009, 10 Pages.

"Notice of Allowance Received for U.S. Appl. No. 12/414,897", Mailed Date: Jul. 18, 2013, Filed Date: Mar. 31, 2009, 8 Pages.

"First Office Action and Search Report Received for Chinese Patent Application No. 201080016198.2", Mailed Date: Jul. 29, 2013, Filed Date: Mar. 26, 2010, 10 Pages.

"Notice of Rejection Received for JP Patent Application No. 2012-503540", Mailed Date: Feb. 17, 2014, Filed Date: Mar. 26, 2010, 8 Pages.

Extended European Search Report for application 10762132.8 dated Apr. 28, 2014, 6 pages.

"Second Office Action and Search Report Received for Chinese Patent Application No. 201080016198.2", Mailed Date: Apr. 10, 2014, Filed Date: Mar. 26, 2010, 13 Pages.

"Notice of Rejection Received for JP Patent Application No. 2012-503540", Mailed Date: Jul. 3, 2014, Filed Date: Mar. 26, 2010, 5 Pages.

"Office Action Issued in Chinese Patent Application No. 201080016198.2", Mailed Date: Sep. 3, 2014, 10 Pages.

\* cited by examiner

PRIORITY-BASED MANAGEMENT OF SYSTEM LOAD LEVEL

CROSS-REFERENCE TO RELATED APPLICATION(S)

This application is a continuation of U.S. patent application Ser. No. 12/414,897, filed Mar. 31, 2009, the entirety of which is incorporated by reference herein.

BACKGROUND OF THE INVENTION

1. Field of the Invention

The present invention generally relates to management of a system load level.

2. Background

Computer systems, such as corporate datacenters, often include a plurality of servers that have applications executing thereon. The servers commonly operate at a relatively low efficiency. For example, some servers may have loads of 10-30%. Virtualization may be used to improve the efficiency by allocating virtual machines to the servers, but each server may still have a load of 10-30% if the allocated virtual machine(s) is not busy. Moreover, the demands of the applications vary over time, causing fluctuations in the loads of the servers.

Although it is often desirable to operate a server at a relatively high efficiency, it may be beneficial to run the server at relatively lower efficiency to accommodate potential increases in demand by the applications. If the efficiency of a server is set too high, the server may not be capable of accommodating an increased demand of the applications. For instance, a failure to accommodate for the increased demand may cause the server to become non-responsive to some requests made by the applications. On the other hand, if the efficiency of the server is set too low, the server may operate less inefficiently than necessary to accommodate the increased demand of the applications.

One proposed technique for managing the load level of a server is to transfer an application's demand to another server to reduce the load of the server from which the demand is transferred. However, this proposed technique may require substantial time and effort. For instance, a search may be necessary to find a server having sufficient resources available to accommodate the demand of the application. Once such a server is found, processes may be employed to transfer the demand, and so on.

SUMMARY

Systems, methods, and computer program products are described herein for managing computer system resources. A plurality of modules (e.g., virtual machines, SQL server instances, or other applications) may be allocated across multiple computer system resources (e.g., processors, servers, etc.). Each module is assigned a priority level. Furthermore, a designated utilization level is assigned to each resource of the computer system. Each resource supports one or more of the modules, and prioritizes operation of the supported modules according to the corresponding assigned priority levels. Furthermore, each resource maintains an overall operation of the supported modules at the designated utilization level.

In an example method, a utilization indicator is received. The utilization indicator indicates a reference utilization level associated with resources of a processing system. Each resource is managed to maintain a load level to be substantially equal to the reference utilization level. A processing capacity of each resource is allocated among application modules that are executed on the resource based on the reference utilization level and priority levels associated with the application modules.

In another example method, a reference utilization level is received by a resource of a processing system. Application modules execute on the resource. A processing capacity of the resource is allocated among the application modules based on priority levels associated with the application modules to cause a load level of the resource to be substantially equal to the reference utilization level.

A computer program product is also described. The computer program product includes a computer-readable medium having computer program logic recorded thereon for enabling a processor-based system to managing a resource. The computer program product includes first and second program logic modules. The first program logic module is for enabling the processor-based system to execute application modules on a resource. The second program logic module is for enabling the processor-based system to allocate a processing capacity of the resource among the application modules based on priority levels associated with the application modules to cause a load level of the resource to be substantially equal to a reference utilization level.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Moreover, it is noted that the invention is not limited to the specific embodiments described in the Detailed Description and/or other sections of this document. Such embodiments are presented herein for illustrative purposes only. Additional embodiments will be apparent to persons skilled in the relevant art(s) based on the teachings contained herein.

BRIEF DESCRIPTION OF THE DRAWINGS/FIGURES

The accompanying drawings, which are incorporated herein and form part of the specification, illustrate the present invention and, together with the description, further serve to explain the principles of the invention and to enable a person skilled in the relevant art(s) to make and use the invention.

FIG. 7 depicts an exemplary implementation of a computer in which embodiments of the present invention may be implemented The features and advantages of the present invention will become more apparent from the detailed description set forth below when taken in conjunction with the drawings, in which like reference characters identify corresponding elements throughout. In the drawings, like reference numbers generally indicate identical, functionally similar, and/or structurally similar elements. The drawing in which an element first appears is indicated by the leftmost digit(s) in the corresponding reference number.

DETAILED DESCRIPTION

I. Introduction

The following detailed description refers to the accompanying drawings that illustrate exemplary embodiments of the present invention. However, the scope of the present invention is not limited to these embodiments, but is instead defined by the appended claims. Thus, embodiments beyond those shown in the accompanying drawings, such as modified versions of the illustrated embodiments, may nevertheless be encompassed by the present invention.

References in the specification to "one embodiment," "an embodiment," "an example embodiment," or the like, indicate that the embodiment described may include a particular feature, structure, or characteristic, but every embodiment may not necessarily include the particular feature, structure, or characteristic. Moreover, such phrases are not necessarily referring to the same embodiment. Furthermore, when a particular feature, structure, or characteristic is described in connection with an embodiment, it is submitted that it is within the knowledge of one skilled in the art to implement such feature, structure, or characteristic in connection with other embodiments whether or not explicitly described.

II. Example Embodiments for Priority-Based Management of System Load Level

Embodiments of the present invention are capable of managing computer system resources. Modules (e.g., virtual machines, SQL server instances, or other applications) are allocated across multiple computer system resources (e.g., processors, servers, etc.). Each module is assigned a priority level, which is an indication of that module's priority relative to the other modules. Furthermore, a designated utilization level is assigned to each resource of the computer system. Each resource supports one or more of the modules, and prioritizes operation of the supported modules according to the corresponding assigned priority levels. Furthermore, each resource maintains operation of the supported modules at the designated utilization level. In this manner, more efficient utilization of the resources may be achieved.

Figure 1:
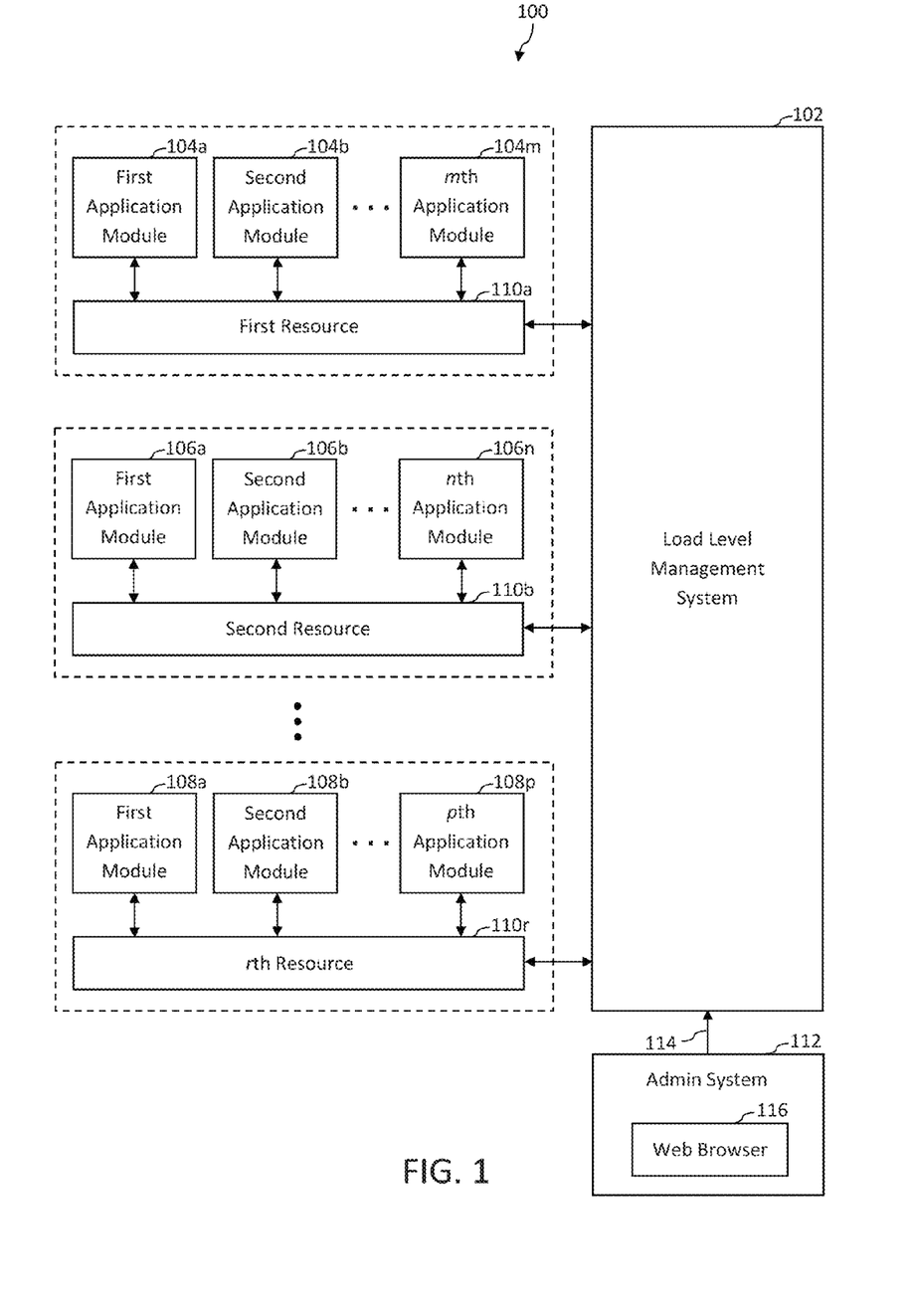
FIG. 1 is a block diagram of an example processing system in accordance with an embodiment of the present invention.

FIG. 1 is a block diagram of an example processing system 100 in accordance with an embodiment. Processing system 100 includes a load level management system 102, a plurality of resources 110a-110r, and an administrative (admin) system 112. Each resource 110 supports one or more applications. For example, first resource 110a supports application modules 104a-104m, second resource 110b supports application modules 106a-106n, and so on.

Admin system 112 is configured to provide a utilization indicator 114 to load level management system 102. Utilization indicator 114 is a reference utilization indication for resources 110 of processing system 100. For instance, load level management system 102 may use utilization indicator 114 to determine a reference utilization level associated with resources 110 of processing system 100. The reference utilization level may correspond to a target load level for each of resources 110, for example.

Admin system 112 may be further configured to provide one or more priority indicators to load level management system 102, or the priority indicator(s) may be provided in other ways. A priority indicator is a priority indication for one of application modules 104a-104m, 106a-106n, etc. that indicates a priority for the particular application module relative to the other modules. For instance, admin system 112 may provide utilization indicator 114 and/or the priority indicator in response to a user of admin system 112 selecting the respective utilization level and/or priority level via a Web browser 116 or other user interface at admin system 112. Load level management system 102 may forward the priority indicator to one or more resources 110 for further processing.

Load level management system 102 is configured to manage resources 110, such that the load level of each resource is substantially equal to the reference utilization level. For instance, load level management system 102 may be configured to determine the instantaneous or average load level of each resource 110 based on a load level indicator received from each resource 110. Load level management system 102 may compare the instantaneous or average load level of a resource 110 with the reference utilization level to determine whether the load level of that resource 110 is to be increased or decreased, so that the load level of the resource 110 is substantially equal to the reference utilization level. In another embodiment, load level management system 102 provides the reference utilization level to each resource 110, and each resource 110 is configured to maintain its load level substantially equal to the reference utilization level.

Application modules 104a-104m, 106a-106n, etc. are configured to perform operations that consume processing capacity of respective resources 110a-110r with which the application modules are associated. For instance, application modules 104a-104m consume the processing capacity of first resource 110a, application modules 106a-106n consume processing capacity of second resource 110b, and so on. Examples of application modules 104 include but are not limited to software applications, virtual machines, SQL server instances, etc.

Resources 110a-110r are configured to provide processing capacity to facilitate operations performed by respective application modules 104a-104m, 106n, etc. Example resources 110 include but are not limited to a server, a processor, multiple processors, etc.

In a first example embodiment, application modules 104a-104m, 106a-106n, etc. are implemented as virtual machines, and resources 110a-110r are implemented as processors. For instance, the processors may allocate their processing capabilities among the virtual machines based on priorities of the respective virtual machines to cause the load levels of the processors to be substantially equal to a reference utilization level associated with the processors.

In a second example embodiment, application modules 104a-104m, 106a-106n, etc. are implemented as SQL server instances, and resources 110a-110r are implemented as servers. For instance, the servers may allocate their processing capabilities among the SQL server instances based on priorities of the respective SQL server instances to cause the load levels of the servers to be substantially equal to a reference utilization level associated with the servers.

These example embodiments are provided for illustrative purposes and are not intended to be limiting. Persons skilled in the relevant art(s) will recognize that application modules 104a-104m, 106a-106n, etc. may be implemented as any suitable types of modules. It will be further recognized that resources 110a-110r may be any suitable type of resources that are capable of providing processing capabilities to facilitate operations performed by respective application modules 104a-104m, 106a-106n, etc.

Figure 2:
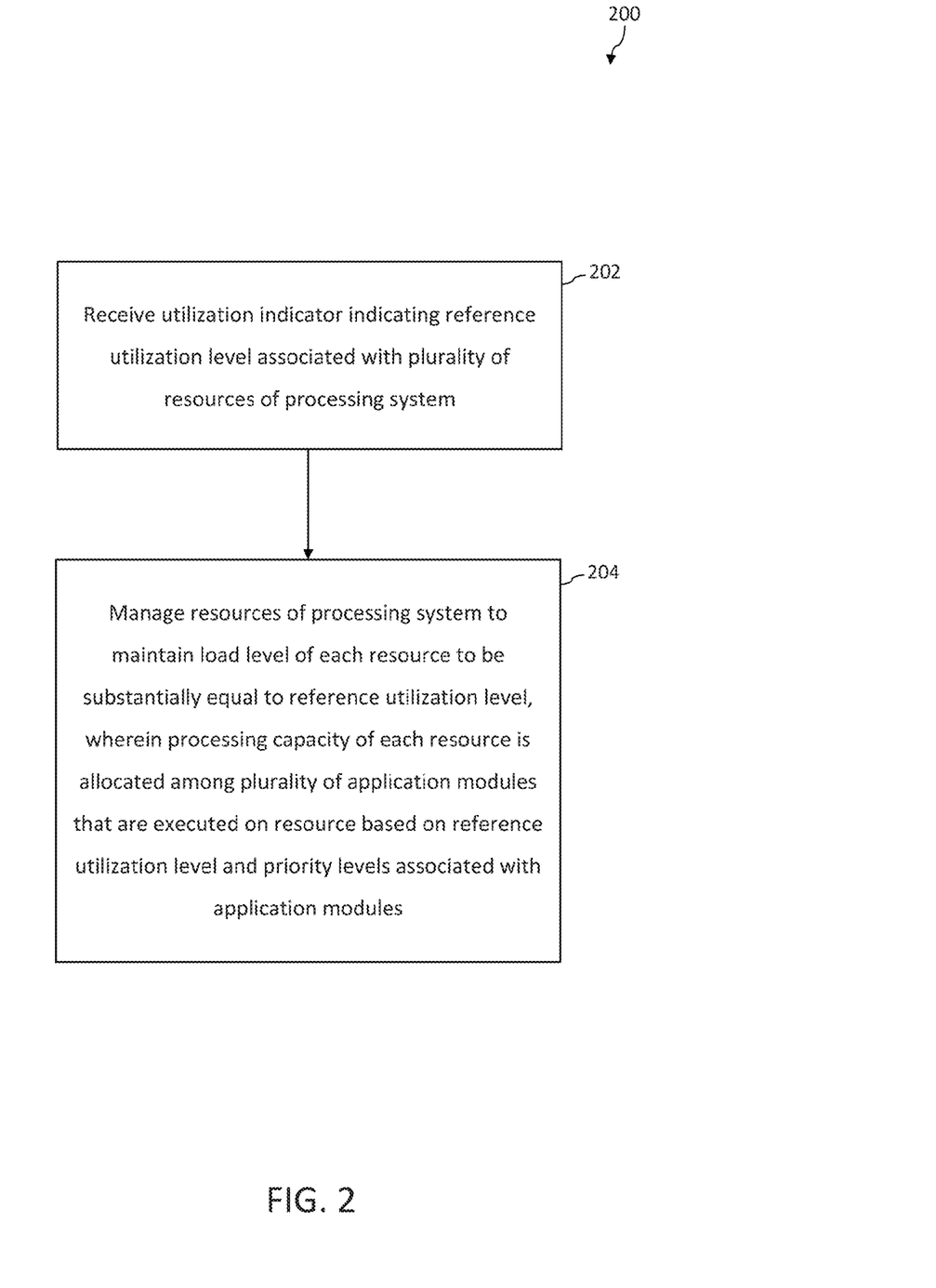
FIG. 2 depicts a flowchart of a method for managing a processing system in accordance with an embodiment of the present invention.
Figure 3:
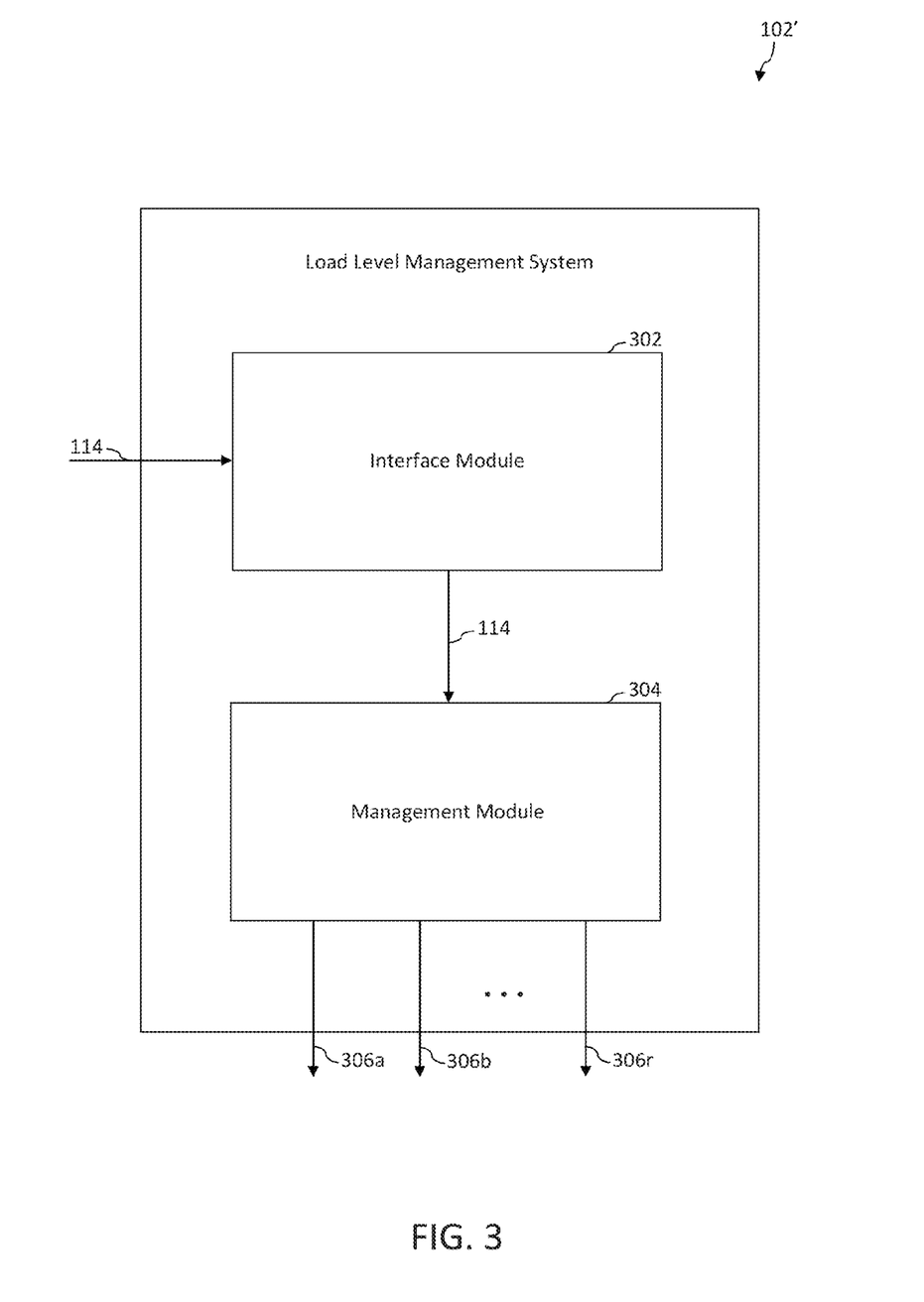
FIG. 3 is a block diagram of an example implementation of the load level management system shown in FIG. 1 in accordance with an embodiment of the present invention.

FIG. 2 depicts a flowchart 200 of a method for managing a processing system in accordance with an embodiment. Flowchart 200 may be performed by load level management system 102 shown in FIG. 1, for example. For illustrative purposes, flowchart 200 is described with respect to a load level management system 102' shown in FIG. 3, which is an example of load level management system 102, according to an embodiment. As shown in FIG. 3, load level management system 102' includes an interface module 302 and a management module 304. Further structural and operational embodiments will be apparent to persons skilled in the relevant art(s) based on the discussion regarding flowchart 200. Flowchart 200 is described as follows.

As shown in FIG. 2, the method of flowchart 200 begins at step 202. In step 202, a utilization indicator is received indicating a reference utilization level associated with a plurality of resources of a processing system. For instance, interface module 302 may receive the utilization indicator. In an embodiment, admin system 112 is configured to provide a user interface element to enable selection of the reference utilization level. Interface module 302 may receive utilization indicator 114 in response to a user selecting the reference utilization level via the user interface element.

According to an embodiment, admin system 112 may be configured to provide a user interface element to enable selection of one or more of the priority levels associated with application modules 104a-104m, 106a-106n, etc. Interface module 302 may receive priority indicators corresponding to the respective priority levels in response to a user selecting the priority levels via the user interface element. Each of the user interface elements described above may be a text-based interface element, a graphical interface element (e.g., a pop-up, drop-down, or equivalent menu), or other user interface element.

At step 204, the resources of the processing system are managed to maintain a load level of each resource to be substantially equal to the reference utilization level. For example, management module 304 may manage the resources of the processing system. In accordance with this example, management module 304 may provide maintenance indicators 306a-306r to respective resources 110a-110r of processing system 100. Maintenance indicators 306a-306r are load level maintenance indications for resources 110. For instance, each resource 110 may use a respective maintenance indicator 306 to determine whether the load level of that resource 110 is to be increased or decreased to maintain the load level of the resource 110 to be substantially equal to the reference utilization level. For example, each resource 110 may be configured to compare a current load level to the load level indicated by the reference utilization level, and to adjust the load level according to any determined difference between the current load level and the reference utilization level.

In an example implementation, the resources of the processing system may be managed to maintain an average load level of each resource to be substantially equal to the reference utilization level. For instance, the load level may be averaged over a fraction of a second, multiple seconds, multiple minutes, multiple hours, etc.

A processing capacity of each resource is allocated among a plurality of application modules that are executed on that resource based on the reference utilization level and priority levels associated with the application modules. For instance, a processing capacity of a first resource may be allocated among a first plurality of application modules that are executed on the first resource. A processing capacity of a second resource may be allocated among a second plurality of application modules executed on the second resource, and so on. For example, an application module having a relatively high priority may be allocated more of the processing capacity of a resource than an application module having a relatively low priority. In another example, an application module having a relatively low priority may be allocated less of the processing capacity of a resource than an application module having a relatively high priority.

Figure 4:
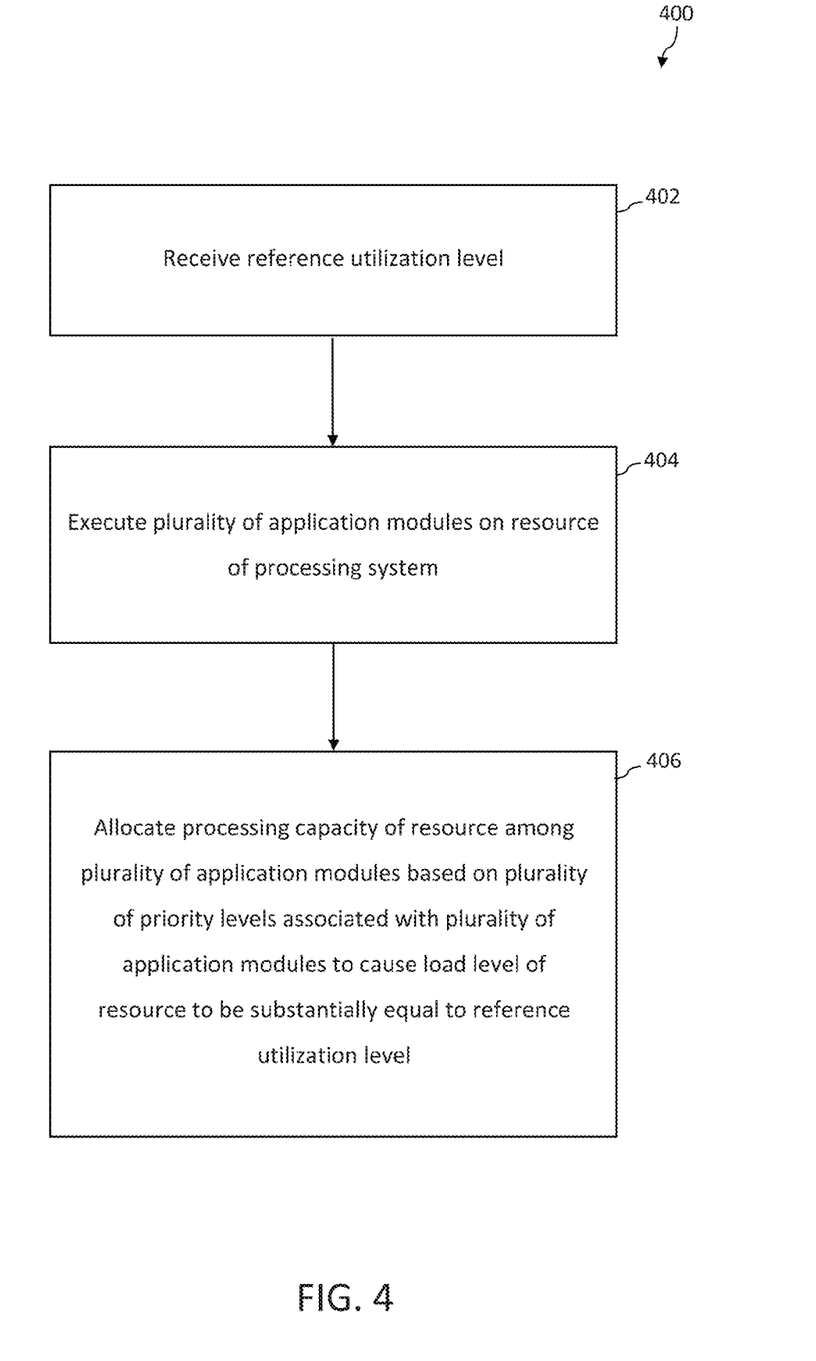
FIG. 4 depicts a flowchart of a method for managing a resource in accordance with an embodiment of the present invention.
Figure 5:
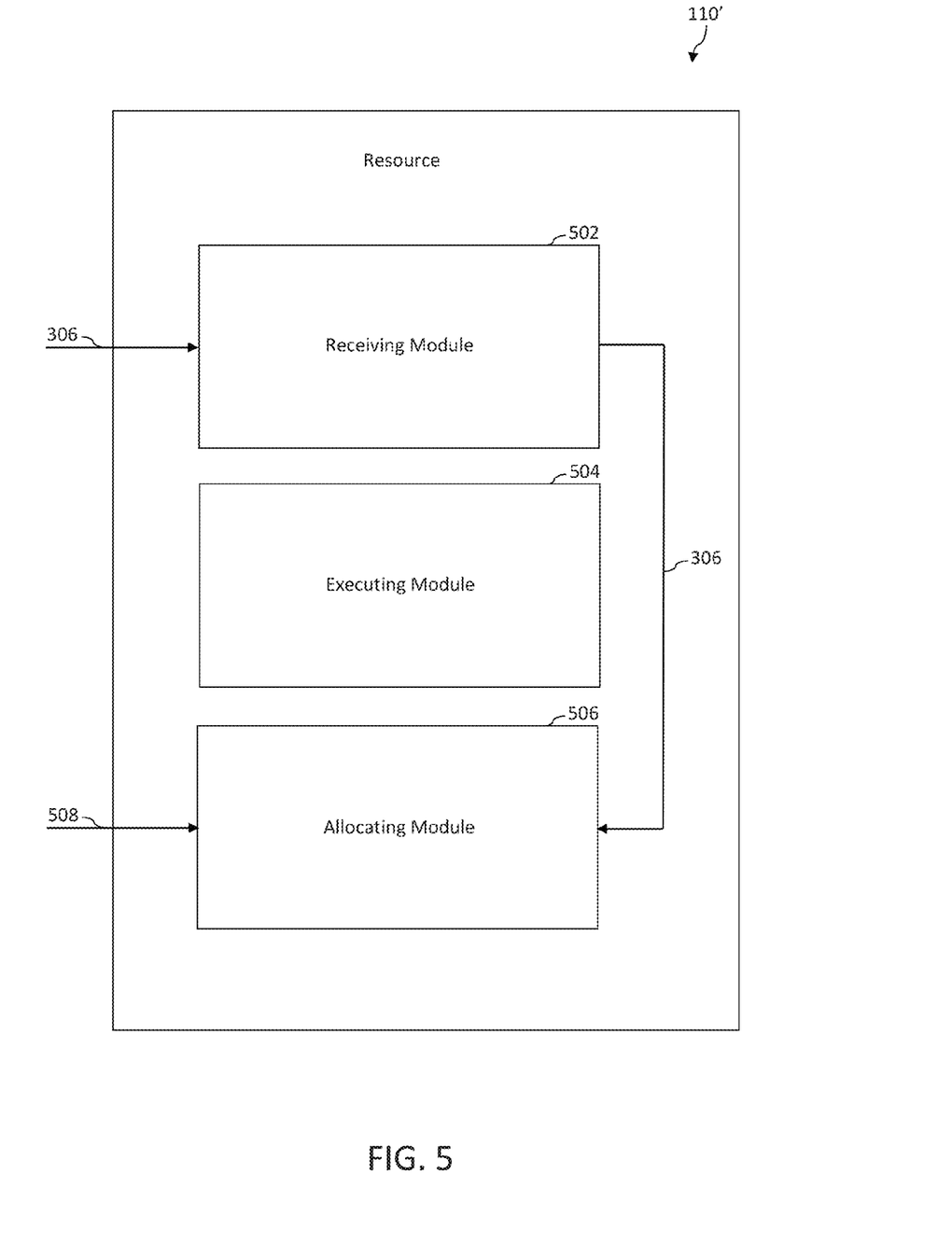
FIG. 5 is a block diagram of an example implementation of a resource shown in FIG. 1 in accordance with an embodiment of the present invention.

FIG. 4 depicts a flowchart 400 of a method for managing a resource in accordance with an embodiment. Flowchart 400 may be performed by any of resources 110a-110r shown in FIG. 1, for example. For illustrative purposes, flowchart 400 is described with respect to a resource 110' shown in FIG. 5, which is an example of a resource 110, according to an embodiment. As shown in FIG. 5, resource 110' includes a receiving module 502, an executing module 504, and an allocating module 506. Further structural and operational embodiments will be apparent to persons skilled in the relevant art(s) based on the discussion regarding flowchart 400. Flowchart 400 is described as follows.

As shown in FIG. 4, the method of flowchart 400 begins at step 402. In step 402, a reference utilization level is received. For instance, receiving module 502 may receive the utilization level via maintenance indicator 306 or other indicator.

At step 404, a plurality of application modules are executed on a resource of a processing system. For instance, executing module 504 may execute the plurality of application modules on the resource. The resource may be resource 110', for example.

At step 406, a processing capacity of the resource is allocated among the plurality of application modules based on a plurality of priority levels associated with the plurality of application modules to cause a load level of the resource to be substantially equal to the reference utilization level. For example, allocating module 506 may allocate the processing capacity of the resources among the plurality of application modules. Allocating module 506 may receive maintenance indicator 306 from receiving module 502. For instance, allocating module 506 may use maintenance indicator 306 to determine an amount of the total processing capacity of the resource to allocate among the plurality of application modules to cause the load level of the resource to be substantially equal to the reference utilization level.

Allocating module 506 may use the plurality of priority levels to determine portions of the determined amount of the total processing capacity to allocate to the respective application modules. For instance, allocating module 506 may allocate a first portion of the determined amount to a first application module based on a first priority level associated with the first application module. Allocating module 506 may allocate a second portion of the determined amount to a second application module based on a second priority level associated with the second application module, and so on.

In an embodiment, receiving module 502 may receive priority indicators indicating the priority levels of the modules executing on the resource. The priority indicators may be indicated in a maintenance indicator 306 received from load level management system 102, for example. Receiving module 502 may forward the priority indicators or the priority levels indicated by the priority indicators to allocating module 506 for further processing. Alternatively, each module 502 may have previously been assigned a respective priority level.

Allocating module 506 may transfer processing capacity of resource 110' from a first application module having a first priority level to a second application module having a second priority level that is greater than the first priority level to facilitate the availability of processing capacity of resource 110' for the second application module. In an example implementation, allocating module 506 may be configured to automatically transfer the processing capacity from the first application module to the second application module upon receiving a request 508 from the second application module based on the second priority level exceeding the first priority level. For instance, allocating module 506 may set the load level of the first application module to substantially zero to facilitate the availability of the processing capacity.

The priorities of the respective application modules and the reference utilization level may be changed at any time. For example, referring to FIG. 3, interface module 302 of load level management system 102' may receive a revised priority indicator indicating at least one revised priority level of a respective at least one application module. Management module 304 of load level management system 102' may provide an indication of the at least one revised priority level to receiving module 502 of resource 110' via a maintenance indicator 306. Allocating module 506 of resource 110' may reallocate the processing capacity of the resource among the plurality of application modules based on the at least one revised priority level.

In another example, interface module 302 of load level management system 102' may receive a revised utilization indicator indicating a revised reference utilization level associated with resource 110'. Management module 304 of load level management system 102' may provide an indication of the revised utilization level to receiving module 502 of resource 110' via a maintenance indicator 306. Allocating module 506 of resource 110' may reallocate the processing capacity of the resource among the plurality of application modules based on the revised reference utilization level. The portions of the resources that are allocated to the respective application modules may be adjusted proportionally in response to the changed priority level(s) and/or the changed utilization level.

In one aspect, the revised utilization indicator may be received in response to a user revising the reference utilization level on the fly via a user interface element, for example. In another aspect, the revised reference utilization level may be received in accordance with a predetermined schedule. For example, the reference utilization level may be set to indicate a relatively lower utilization level at a first time during the day. The reference utilization level may be revised to indicate a relatively higher utilization level at a second time during the day. Accordingly, allocating module 506 may allocate the processing capacity of resource 110' among the plurality of application modules to cause the load level of resource 110' to be substantially equal to the relatively lower utilization level during the period between the first and second times. Allocating module 506 may re-allocate the processing capacity of resource 110' among the plurality of application modules to cause the load level of resource 110' to be substantially equal to the relatively higher utilization level during the period after the second time.

Figure 6:
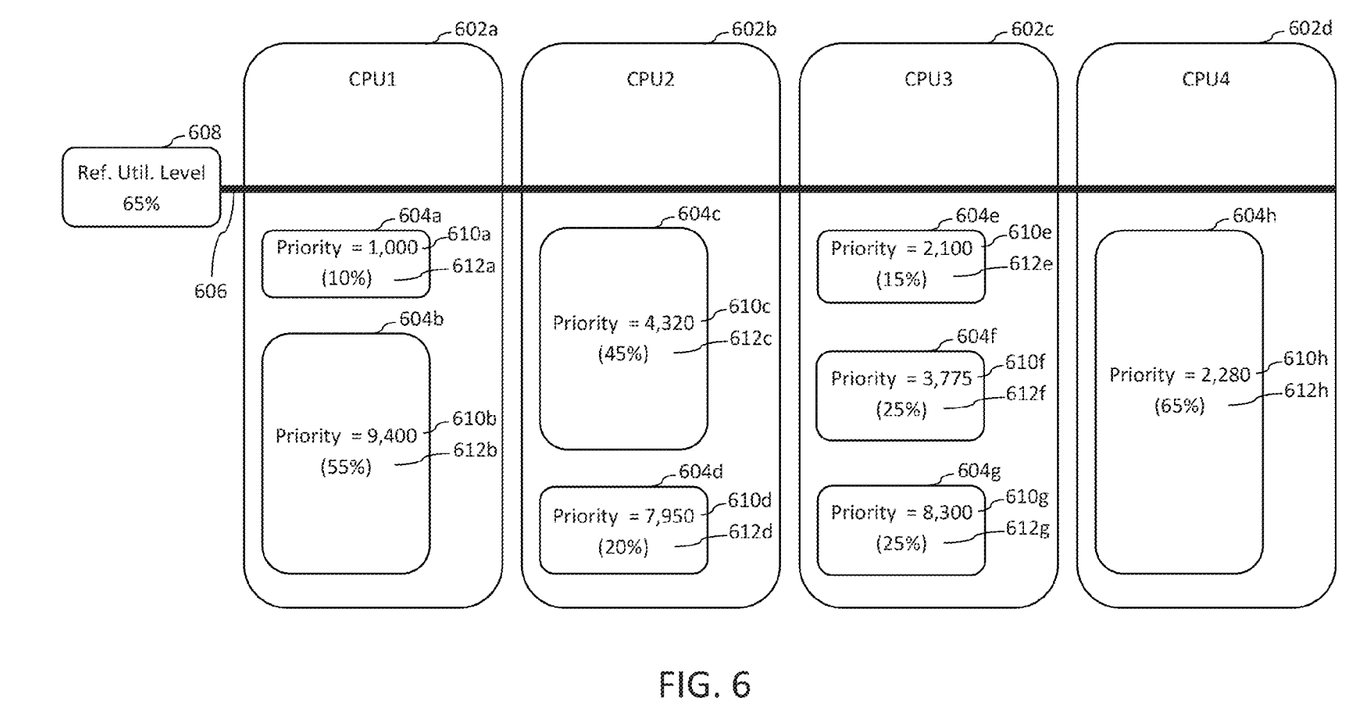
FIG. 6 depicts a plurality of resources having load levels that are managed in accordance with an embodiment of the present invention.

FIG. 6 depicts a plurality of resources 602 having load levels that are managed in accordance with an embodiment. Resources 602 are shown to be central processing units (CPUs) for illustrative purposes and are not intended to be limiting. For example, resources 602a-602d may represent respective processor cores in a common socket, though the scope of the embodiments described herein is not limited in this respect. It will be recognized that resources may be processors, servers, etc. As shown in FIG. 6, each resource 602 is managed to have a load level that is substantially equal to reference utilization level 608, which is shown to be 65% for illustrative purposes. Reference utilization level 608 may be set to any suitable level in a range from 0% to 100%.

Resources 602 execute application modules 604, which are described as being virtual machines for illustrative purposes. Persons skilled in the relevant art(s) will recognize that application modules 604 may be virtual machines, SQL server instances, etc. As shown in FIG. 6, application modules 604a and 604b are executed on resource 602a. Application modules 604c and 604d are executed on resource 602b. Application modules 604e, 604f, and 604g are executed on resource 602c. Application module 604h is executed on resource 602d. Each resource 602 may execute any number of application modules 604. For instance, a resource 602 may execute hundreds or thousands of modules.

Each application module 604 is assigned a priority level 610, which is an indication of that module's priority with respect to other modules. Priority levels 610 are shown in FIG. 6 to be numerical values for illustrative purposes, though it will be recognized that priority levels 610 may be based on any suitable scale. For example, a priority level 610 may be a number in a range from one to a designated number (e.g., 10, 50, 10,000, etc.). In another example, a priority level 610 may have a value of "high", "medium", or "low". Application modules 604 having a relatively high priority level 610 may be considered as having a relatively higher business impact; whereas, application modules 604 having a relatively low priority level 610 may be considered as having a relatively lower business impact. For example, application modules 604 that conduct critical or time-sensitive operations for a business may be assigned relatively high priority levels 610. In another example, application modules 604 that conduct operations that are neither critical nor time-sensitive may be assigned relatively low priority levels 610.

For instance, a front-end Web server or an ad server that serves online ads to generate income for a business may be associated with a relatively high priority level 610. An application module 604 that performs a back-end service, such as log shipping, search crawling, or checking information on the Internet, may be associated with a relatively low priority level 610. For example, waiting for hours or until the end of the day to perform such back-end services may not have a substantial impact on a business.

Each resource 602 prioritizes operation of the application modules 604 that are executed on that resource 602 according to the corresponding assigned priority levels 610. For instance, resource 602a prioritizes operations of application module 604a according to priority level 610a. Resource 602a prioritizes operations of application module 604b according to priority level 610b, and so on. When requests for processing capacity from higher priority module(s) 604 wind down, a lower priority module 604 may "wake up" dynamically on the fly to perform its operations, utilizing processing capacity of the resource 602 with which the modules 604 are associated. In one aspect, the resource 602 may provide an instruction to the lower priority module 604 to wake up that module 604 in response to the resource 602 determining that the requests for processing capacity from the higher priority module(s) 604 are winding down. The resource 602 may transfer processing capacity of the resource 602 back to a higher priority module 604 upon receiving a request for the processing capacity from the higher priority module 604. In fact, the resource 602 may take the lower priority module 604 off-line (i.e., to a processing capacity allocation of 0%) to facilitate making the requested processing capacity available to the higher priority module 604.

The allocation of processing capacity among application modules 604 is performed such that the load level of each resource 602 is substantially equal to reference utilization level 608. Allocation indications 612 indicate the portion of a resource's processing capacity that is allocated to the respective application modules 604. For example, allocation indication 612a indicates that resource 602a allocates 10% of the processing capacity of resource 602a to application module 604a. Resource 602a allocates this processing capacity to application module 604a based on priority level 610a, which is assigned to application module 604a. Allocation indication 612b indicates that resource 602a allocates 55% of the processing capacity of resource 602a to application module 604b. Resource 602a allocates this processing capacity to application module 604b based on priority level 610b, which is assigned to application module 604b. The processing capacity of resource 602a that is allocated among application modules 604a and 604b is 10%+55%=65%, which is equal to reference utilization level 608.

An application module 604 having a relatively high priority level 610 may not necessarily consume a relatively high proportion of the processing capacity of the resource 602 on which the application module 604 is executed. For instance, application modules 604d and 604g are shown to consume relatively little of the processing capacity of respective resources 602b and 602c, though each of these application modules is associated with a relatively high priority level 610d, 610g. For example, application module 604d has a priority level 610d of 7,950 and an allocation of 20% of the processing capacity of resource 602b. In another example, application module 604g has a priority level 710g of 8,300 and an allocation of 25% of the processing capacity of resource 602c.

It should be noted that a resource 602 may be configured to transfer processing capacity from a lower priority module 604 to a higher priority module 604 when that processing capacity is requested by the higher priority module 604. For example, a resource 602 may transfer resources from application module 604c to application module 604d when that processing capacity is requested by application module 604d in accordance with embodiments described herein. In another example, a resource 602 may transfer processing capacity from at least one of application modules 604e and 604f to application module 604g when that processing capacity is requested by application module 604g in accordance with embodiments described herein.

Figure 7:
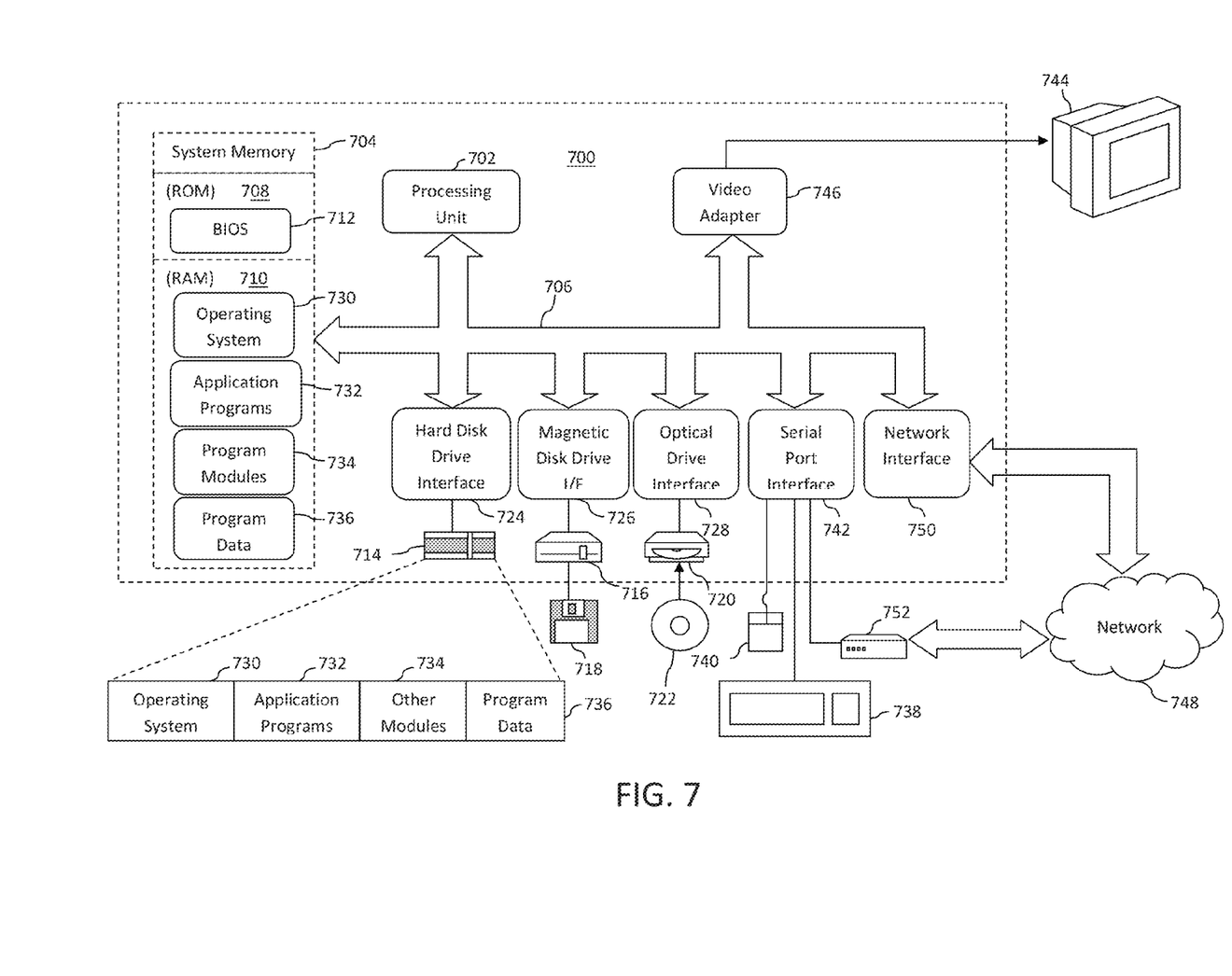

FIG. 7 depicts an exemplary implementation of a computer 700 in which embodiments may be implemented. Any one or more of the load level management system 102, resources 104, admin system 112 shown in FIG. 1, or resources 602 shown in FIG. 6 may be implemented similarly to computer 700, including one or more features of computer 700 and/or alternative features. Computer 700 may be a general-purpose computing device in the form of a conventional personal computer, a mobile computer, or a workstation, for example, or computer 700 may be a special purpose computing device. The description of computer 700 provided herein is provided for purposes of illustration, and is not intended to be limiting. Embodiments may be implemented in further types of computer systems, as would be known to persons skilled in the relevant art(s).

As shown in FIG. 7, computer 700 includes a processing unit 702, a system memory 704, and a bus 706 that couples various system components including system memory 704 to processing unit 702. Bus 706 represents one or more of any of several types of bus structures, including a memory bus or memory controller, a peripheral bus, an accelerated graphics port, and a processor or local bus using any of a variety of bus architectures. System memory 704 includes read only memory (ROM) 708 and random access memory (RAM) 710. A basic input/output system 712 (BIOS) is stored in ROM 708.

Computer 700 also has one or more of the following drives: a hard disk drive 714 for reading from and writing to a hard disk, a magnetic disk drive 716 for reading from or writing to a removable magnetic disk 718, and an optical disk drive 720 for reading from or writing to a removable optical disk 722 such as a CD ROM, DVD ROM, or other optical media. Hard disk drive 714, magnetic disk drive 716, and optical disk drive 720 are connected to bus 706 by a hard disk drive interface 724, a magnetic disk drive interface 726, and an optical drive interface 728, respectively. The drives and their associated computer-readable media provide nonvolatile storage of computer-readable instructions, data structures, program modules and other data for the computer. Although a hard disk, a removable magnetic disk and a removable optical disk are described, other types of computer-readable media can be used to store data, such as flash memory cards, digital video disks, random access memories (RAMs), read only memories (ROM), and the like.

A number of program modules may be stored on the hard disk, magnetic disk, optical disk, ROM, or RAM. These programs include an operating system 730, one or more application programs 732, other program modules 734, and program data 736. Application programs 732 or program modules 734 may include, for example, computer program logic for implementing load level management system 102, application modules 104, 106, 108, etc., admin system 112, interface module 302, management module 304, receiving module 502, executing module 504, allocating module 506, application modules 604, flowchart 200 (including any step of flowchart 200), and/or flowchart 400 (including any step of flowchart 400), as described herein.

A user may enter commands and information into the computer 700 through input devices such as keyboard 738 and pointing device 740. Other input devices (not shown) may include a microphone, joystick, game pad, satellite dish, scanner, or the like. These and other input devices are often connected to the processing unit 702 through a serial port interface 742 that is coupled to bus 706, but may be connected by other interfaces, such as a parallel port, game port, or a universal serial bus (USB).

A monitor 744 or other type of display device is also connected to bus 706 via an interface, such as a video adapter 746. In addition to the monitor, computer 700 may include other peripheral output devices (not shown) such as speakers and printers.

Computer 700 is connected to a network 748 (e.g., the Internet) through a network interface or adapter 750, a modem 752, or other means for establishing communications over the network. Modem 752, which may be internal or external, is connected to bus 706 via serial port interface 742.

As used herein, the terms "computer program medium" and "computer-readable medium" are used to generally refer to media such as the hard disk associated with hard disk drive 714, removable magnetic disk 718, removable optical disk 722, as well as other media such as flash memory cards, digital video disks, random access memories (RAMs), read only memories (ROM), and the like.

As noted above, computer programs and modules (including application programs 732 and other program modules 734) may be stored on the hard disk, magnetic disk, optical disk, ROM, or RAM. Such computer programs may also be received via network interface 750 or serial port interface 742. Such computer programs, when executed or loaded by an application, enable computer 700 to implement features of embodiments of the present invention discussed herein. Accordingly, such computer programs represent controllers of the computer 700.

Embodiments are also directed to computer program products comprising software stored on any computer useable medium. Such software, when executed in one or more data processing devices, causes a data processing device(s) to operate as described herein. Embodiments of the present invention employ any computer-useable or computer-readable medium, known now or in the future. Examples of computer-readable mediums include, but are not limited to storage devices such as RAM, hard drives, floppy disks, CD ROMs, DVD ROMs, zip disks, tapes, magnetic storage devices, optical storage devices, MEMs, nanotechnology-based storage devices, and the like.

Embodiments described herein have a variety of benefits, as compared to conventional load level management techniques. For example, embodiments may advantageously allocate processing capacity of resources (e.g., processors, servers, etc.) among application modules (e.g., virtual machines, SQL server instances, or other applications) that execute on the resources based on priority levels associated with the modules to achieve a designated load level for the system. For instance, embodiments may allocate the processing capacity to cause the load levels of the resources to be substantially equal to a reference utilization level. The load levels of the respective resources may be managed based on a common reference utilization level or different respective reference utilization levels.

In accordance with some embodiments, application modules need not be moved from one resource to another to accommodate varying load levels of the application modules. Rather, the processing capacity of resources may be allocated among the application modules that are executed on the resources based on priorities associated with the application modules to cause the load level of each resource to be substantially equal to a reference utilization level.

The embodiments described herein are discussed with reference to application modules executed on resources of a processing system for illustrative purposes and are not intended to be limiting. Persons skilled in the relevant art(s) will recognize that the load level management techniques described herein are applicable in a variety of other environments. For example, the techniques may be used to allocate the input/output (I/O) capacity of one or more non-volatile storage devices (e.g., hard drives or partitions thereof, memory devices, etc.) among a plurality of software and/or hardware devices based on priority levels associated with the devices to cause the load level of each non-volatile storage device to be substantially equal to a reference utilization level. In another example, the techniques may be used to manage the load levels of resources that are in communication with a plurality of hosts (e.g., computers). The processing capacity of the resources may be allocated among the plurality of hosts in accordance with priorities assigned thereto, such that the load levels of the resources are substantially equal to a reference utilization level.

III. Conclusion

While various embodiments of the present invention have been described above, it should be understood that they have been presented by way of example only, and not limitation. It will be apparent to persons skilled in the relevant art(s) that various changes in form and details can be made therein without departing from the spirit and scope of the invention. Thus, the breadth and scope of the present invention should not be limited by any of the above-described exemplary embodiments, but should be defined only in accordance with the following claims and their equivalents.

What is claimed is:

1. A method of managing a processing system, comprising:
receiving a utilization indicator indicating a reference utilization level associated with a plurality of resources of the processing system; and
managing the resources of the processing system to maintain a load level of each resource to be substantially equal to the reference utilization level,
a processing capacity of each resource being allocated among a plurality of application modules that are executed on the resource based on the reference utilization level and priority levels associated with the application modules, each resource prioritizing operations of each of the plurality of application modules that are executed on the resource with respect to others of the plurality of application modules that are executed on the resource based on the priority levels that are associated with the application modules that are executed on the resource,
each resource being configured to:
transfer a portion of a processing capacity of the resource from a first application module having a first priority to a second application module having a second priority that is greater than the first priority in response to receipt of a request from the second application module for more of the processing capacity of the resource;
determine whether a rate at which requests for processing capacity of the resource are received from the second application module is decreasing; and
re-allocate the portion of the processing capacity of the resource from the second application module to the first application module in response to determining that the rate at which the requests for processing capacity of the resource are received from the second application module is decreasing.

2. The method of claim 1, wherein receiving the utilization indicator includes receiving the utilization indicator indicating the reference utilization level associated with a plurality of processors of the processing system; and
wherein managing the resources includes managing the resources of the processing system to maintain the load level of each processor to be substantially equal to the reference utilization level.

3. The method of claim 1, wherein receiving the utilization indicator includes receiving the utilization indicator indicating the reference utilization level associated with a plurality of servers of the processing system; and
wherein managing the resources includes managing the resources of the processing system to maintain the load level of each server to be substantially equal to the reference utilization level.

4. The method of claim 1, wherein the processing capacity of each resource is allocated among a plurality of virtual machines that are executed on the resource based on the reference utilization level and priority levels associated with the virtual machines.

5. The method of claim 1, wherein the processing capacity of each resource is allocated among a plurality of SQL server instances that are executed on the resource based on the reference utilization level and priority levels associated with the SQL server instances.

6. The method of claim 1, further comprising:
providing a user interface element to enable selection of the plurality of priority levels.

7. The method of claim 1, further comprising:
providing a user interface element to enable selection of the reference utilization level.

8. The method of claim 1, wherein managing the resources includes managing the resources of the processing system to maintain an average load level of each resource to be substantially equal to the reference utilization level.

9. A method of managing a resource, comprising:
receiving a reference utilization level;
executing a plurality of application modules on a resource of a processing system;
allocating a processing capacity of the resource among the plurality of application modules based on a plurality of priority levels associated with the plurality of application modules to cause a load level of the resource to be substantially equal to the reference utilization level, the resource prioritizing operations of each of the plurality of application modules with respect to others of the plurality of application modules based on the plurality of priority levels;
receiving a request from a first application module of the plurality of application modules for more of the processing capacity of the resource;
transferring a portion of the processing capacity of the resource from a second application module of the plurality of application modules to the first application module based on a first priority level associated with the first application module being greater than a second priority level associated with the second application module;
determining whether a rate at which requests for processing capacity of the resource are received from the first application module is decreasing; and
re-allocating the portion of the processing capacity of the resource from the first application module to the second application module in response to determining that the rate at which the requests for processing capacity of the resource are received from the first application module is decreasing.

10. The method of claim 9, wherein receiving comprises:
receiving the reference utilization level that is associated with a plurality of resources that includes the resource.

11. The method of claim 9, wherein allocating the processing capacity includes allocating substantially none of the processing capacity of the resource to the first application module based on the first priority level.

12. The method of claim 9, wherein allocating the processing capacity includes allocating substantially all of the processing capacity of the resource to a first application module of the plurality of application modules based on a first priority level associated with the first application module;
wherein the method further comprises:
re-allocating the processing capacity of the resource to provide less than substantially all of the processing capacity of the resource to the first application module;
wherein receiving the request comprises:
receiving the request from the first application module in response to re-allocating the processing capacity of the resource to provide less than substantially all of the processing capacity of the resource to the first application module.

13. The method of claim 9, further comprising:
receiving a revised priority level associated with at least one application module of the plurality of application modules; and
re-allocating the processing capacity of the resource among the plurality of application modules based on the revised priority level to cause the load level of the resource to be substantially equal to the reference utilization level.

14. The method of claim 9, further comprising:
receiving a revised reference utilization level; and
re-allocating the processing capacity of the resource among the plurality of application modules based on the plurality of priority levels associated with the plurality of application modules to cause the load level of the resource to be substantially equal to the revised reference utilization level.

15. The method of claim 14, wherein receiving the revised reference utilization indicator is performed in accordance with a predetermined schedule.

16. The method of claim 9, wherein allocating the processing capacity includes allocating the processing capacity of the resource among the plurality of application modules based on the plurality of priority levels associated with the plurality of application modules to cause an average load level of the resource to be substantially equal to the reference utilization level.

17. A computer program product comprising a computer-readable medium having computer program logic recorded thereon for enabling a processor-based system to managing a resource, the computer program product comprising:
a first program logic module for enabling the processor-based system to execute a plurality of application modules on a resource;
a second program logic module for enabling the processor-based system to allocate a processing capacity of the resource among the plurality of application modules based on a plurality of priority levels associated with the plurality of application modules to cause a load level of the resource to be substantially equal to a reference utilization level;
a third program logic module for enabling the processor-based system to prioritize operations of each of the plurality of application modules with respect to others of the plurality of application modules based on the plurality of priority levels; and
a fourth program logic module for enabling the processor-based system to transfer a portion of the processing capacity of the resource from a first application module of the plurality of application modules to a second application module of the plurality of application modules in response to a request from the second application module for more of the processing capacity of the resource, based on a second priority level associated with the second application module being greater than a first priority level associated with the first application module, the fourth program logic module comprising:
logic for enabling the processor-based system to determine whether a rate at which requests for processing capacity of the resource are received from the second application module is decreasing; and
logic for enabling the processor-based system to re-allocate the portion of the processing capacity of the resource from the second application module to the first application module in response to a determination that the rate at which the requests for processing capacity of the resource are received from the second application module is decreasing.

18. The computer program product of claim 17, further comprising:
a fifth program logic module for enabling the processor-based system to re-allocate the processing capacity of the resource among the plurality of application modules based on the plurality of priority levels associated with the plurality of application modules to cause the load level of the resource to be substantially equal to a revised reference utilization level.

19. The computer program product of claim 17, further comprising:
a fifth program logic module for enabling the processor-based system to provide a user interface element to enable selection of the plurality of priority levels.

20. The computer program product of claim 17, further comprising:
a fifth program logic module for enabling the processor-based system to provide a user interface element to enable selection of the reference utilization level.

* * * * *